United States Patent
Usuba et al.

(10) Patent No.: US 10,550,001 B2
(45) Date of Patent: Feb. 4, 2020

(54) GRAPHITE MATERIAL

(71) Applicant: NIPPON TECHNO-CARBON CO., LTD., Kurokawa-gun (JP)

(72) Inventors: Hidehiko Usuba, Kurokawa-gun (JP); Toshiya Suzuki, Kurokawa-gun (JP)

(73) Assignee: NIPPON TECHNO-CARBON CO., LTD., Kurokawa-gun (JP)

( * ) Notice: Subject to any disclaimer, the term of this patent is extended or adjusted under 35 U.S.C. 154(b) by 0 days.

(21) Appl. No.: 16/476,966

(22) PCT Filed: Aug. 23, 2018

(86) PCT No.: PCT/JP2018/031214
§ 371 (c)(1),
(2) Date: Jul. 10, 2019

(87) PCT Pub. No.: WO2019/065018
PCT Pub. Date: Apr. 4, 2019

(65) Prior Publication Data
US 2019/0352188 A1    Nov. 21, 2019

(30) Foreign Application Priority Data
Sep. 28, 2017 (JP) .................. 2017-187926

(51) Int. Cl.
*C01B 32/20* (2017.01)
*H05B 3/14* (2006.01)

(52) U.S. Cl.
CPC ............ *C01B 32/20* (2017.08); *H05B 3/145* (2013.01); *C01P 2002/60* (2013.01); *C01P 2002/77* (2013.01); *C01P 2002/78* (2013.01); *C01P 2006/10* (2013.01); *C01P 2006/40* (2013.01)

(58) Field of Classification Search
CPC ..... C01B 32/20; C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/205; C01B 32/21; C01B 32/215; C01B 32/22; C01B 32/225; C01B 32/23; H05B 3/145; C01P 2002/77; C01P 2002/60; C01P 2006/40; C01P 2002/78; C01P 2006/10

See application file for complete search history.

(56) References Cited

U.S. PATENT DOCUMENTS

2016/0200579 A1* 7/2016 Adrianowycz ....... C04B 35/522
                                                            423/448

FOREIGN PATENT DOCUMENTS

| JP | 62-241815 A | 10/1987 | |
| JP | 64-52674 A | 2/1989 | |
| JP | 02-59468 A | 2/1990 | |
| JP | 07-165467 A | 6/1995 | |
| JP | H07165467 * | 6/1995 | ............ C04B 35/52 |
| JP | 09-48665 A | 2/1997 | |
| JP | 10-203869 A | 8/1998 | |
| JP | 2001-031473 A | 2/2001 | |
| JP | 2003-212655 A | 7/2003 | |

OTHER PUBLICATIONS

Machine Translation of JPH07165467 to Tokai Carbon (Year: 1995).*
International Search Report dated Nov. 27, 2018, issued for PCT/JP2018/031214.

* cited by examiner

Primary Examiner — Daniel C. McCracken
(74) Attorney, Agent, or Firm — Locke Lord LLP

(57) ABSTRACT

Provided is a metallic impurity-free graphite material utilizing Joule heat generation with well-balanced resistances at room temperature and at high temperatures. The graphite material has a specific resistance at 25° C. ($\rho_{25}$) of 10.0 µΩ·m or more and 12.0 µΩ·m or less; a specific resistance at 1600° C. ($\rho_{1600}$) of 9.5 µΩ·m or more and 11.0 µΩ·m or less; a ratio ($\rho_{1600}/\rho_{25}$) of specific resistance at 1600° C. to that at 25° C. of 0.85 or more and 1.00 or less; a temperature at which the minimum specific resistance ($\rho_{min}$) appears of 500° C. or higher and 800° C. or lower; a ratio ($\rho_{min}/\rho_{25}$) of the minimum specific resistance to the specific resistance at 25° C. of 0.70 or more and 0.80 or less; and a bulk density of 1.69 g/cm³ or more and 1.80 g/cm³ or less.

2 Claims, No Drawings

GRAPHITE MATERIAL

TECHNICAL FIELD

The present invention relates to a graphite material suitable for a graphite heater.

BACKGROUND ART

A graphite material has a high heat resistance under a non-oxidizing atmosphere and has been widely used for various uses which requires heating to high temperatures, such as a graphite heater, a jig, and a component for a device.

However, a graphite material has been known to have characteristics varying according to the exposure temperature. Particularly, for the specific resistance, as distinct from a metal material, or the like, the specific resistance decreases with an increase in temperature, and when the temperature exceeds a given temperature, the specific resistance turns around to increase.

Methods using the graphite material as a heat source include a method involving arc discharge at the tip part and a method utilizing Joule heat generation from the main body. In either method, the specific resistance at high temperatures is important. In the method involving arc discharge, a lower main body resistance results in more efficient power supply, and hence there is a demand for a lower specific resistance product. In contrast, in the method utilizing Joule heat generation, a high specific resistance product tends to be demanded for efficient heat generation. When the resistance at room temperature is high, the resistance at high temperatures tends to be greatly reduced. Accordingly, a balance between the resistance at room temperature and the resistance at high temperatures is important considering the restriction of the maximum voltage or the maximum current of the power supply device. Further, for a material with a small reduction rate of the specific resistance at high temperatures, the resistance at room temperature tends to be lower. Thus, it is necessary to reduce the design cross section of the heater in order to obtain the necessary heat generation amount, and the durability therefore tends to be inferior.

In regard to such a problem, PTL 1 discloses a method for manufacturing an isotropic graphite having a high specific resistance by adding a graphite powder to a coke powder as a raw material filler. However, PTL 1 does not mention the behavior of the specific resistance at high temperatures, and no sufficient study has been made therein.

PTL 2 proposes a graphite material obtained by adding a titanium element, an aluminum element, and a boron element, in addition to a coke powder and a graphite powder, as a raw material filler for suppressing the resistance change rate at high temperatures within 15%, and a manufacturing method thereof. The metal type elements included in the graphite material described become impurities and hence are not preferable in a semiconductor manufacturing device or the like.

Further, PTL 3 proposes a graphite material with the specific resistance at 1600° C. kept high. However, reduction by around about 30% is observed as compared with the value at room temperature, and the output region of the power supply device is required to be designed wide. Thus, the graphite material is still not preferable.

CITATION LIST

Patent Literature

[PTL 1] Japanese Patent Application Publication No. H02-59468

[PTL 2] Japanese Patent Application Publication No. H09-48665

[PTL 3] Japanese Patent Application Publication No. 2001-31473

SUMMARY OF INVENTION

It is an object of the present invention to provide a graphite material which is free from metallic compound impurities, shows a small difference between resistances at room temperature and at high temperature, and is suitable as a heating element utilizing Joule heat generation.

In general, a graphite material is an aggregate of microscopic graphite crystals. The specific resistance changes according to the size of the crystal particles, and the behavior in response to temperature changes also changes. When the crystal particles are large in size, the specific resistance at room temperature tends to be low, whereas the specific resistance at high temperatures becomes large. In contrast, when the crystal particles are small in size, the specific resistance at room temperature becomes large, whereas when the temperature is raised, the specific resistance becomes lower within a low temperature region and the specific resistance increases when the temperature exceeds a given temperature region.

The type of raw materials for the graphite material and manufacturing methods of the graphite material affects the size of the crystal. Specifically, a graphite material may be manufactured from an aggregate such as a coke powder, a graphite powder, a natural graphite powder, or carbon black and a binder such as tar or pitch by pulverizing the aggregate, the binder, and the like, then kneading while heating (kneading) the pulverized matter, and subsequently pulverizing, shaping, burning, and graphitizing the kneaded matter. At this time, the size of the crystal changes according to the type of the raw materials, or mixing and manufacturing conditions.

The present inventors have conducted a study on structures, average particle size, and mixing amounts of various aggregates, and mixing amounts of the binder, and have conducted intensive studies on the properties of the graphite materials. As a result, the present inventors have found a graphite material having the optimum resistance characteristics capable of stably generating Joule heat even within the high temperature region, leading up to the completion of the present invention.

Namely, the present invention is a graphite material having a specific resistance at 25° C. ($\rho_{25}$) of 10.0 μΩ·m or more and 12.0 μΩ·m or less, a specific resistance at 1600° C. ($\rho_{1600}$) of 9.5 μΩ·m or more and 11.0 μΩ·m or less, a ratio ($\rho_{1600}/\rho_{25}$) of specific resistance at 1600° C. to that at 25° C. of 0.85 or more and 1.00 or less, a temperature at which the minimum specific resistance ($\rho_{min}$) appears of 500° C. or higher and 800° C. or lower, a ratio ($\rho_{min}/\rho_{25}$) of the minimum specific resistance to the specific resistance at 25° C. of 0.70 or more and 0.80 or less, and a bulk density of 1.69 g/cm$^3$ or more and 1.80 g/cm$^3$ or less.

The graphite material of the present invention preferably has an interplanar distance ($d_{002}$) between carbon net plane layers of 0.3360 nm or more and 0.3365 nm or less, a size (Lc) of a crystallite in a c-axis direction, the size (Lc) indicating the thickness of stacked carbon net plane layers of 55 nm or more and 85 nm or less, and a size (La) of a crystallite in a-axis direction, the size (La) indicating the spread of the carbon net plane, of 60 nm or more and 105 nm or less, and (P1) indicating the graphitization degree of 0.53 or more and 0.60 or less. It is preferable that the product (Lc×La×P1) of the Lc value, the La value, and the P1 value is 1900 nm² or more and 5000 nm² or less. The graphite material of the present invention can preferably be used as a graphite heater to be used utilizing Joule heat generation.

A graphitization degree P1 corresponds to a probability for the adjacent net planes to arrange in a graphitic arrangement. A graphitization degree P1 is determined by the Fourier analysis of the intensity distribution of the two-dimensional (hk) diffraction in an X-ray diffraction view. Further, the product of the value of Lc, which indicates a thickness of stacked carbon net plane layers, the value of La, which indicates the spread of a carbon net plane, and the P1 value, which indicates a graphitization degree, is a value representing the number of free electrons in graphite material unit volume. The value of 1900 nm² or more means that the number of free electrons is considered to be sufficient. In contrast, the value exceeding 5000 nm² means that, although the number of free electrons are sufficient, the influence of the thermal motion of carbon net planes in a high temperature state becomes large, resulting in a tendency of greatly increasing the specific resistance.

A Joule heat-generating element using the graphite material in accordance with the present invention is good in balance between the specific resistance at 25° C. and the specific resistance at 1600° C., and heating up to a temperature region of 1600° C. or higher can be efficiently performed. Further, it becomes possible to provide a heating device with good heating efficiency and easy to control.

DESCRIPTION OF EMBODIMENTS

Embodiments of the present invention will be described below.

A graphite material of the present invention has a specific resistance at 25° C. ($\rho_{25}$) of 10.0 to 12.0 μΩ·m, a specific resistance at 1600° C. ($\rho_{1600}$) of 9.5 to 11.0 μΩ·m, and a ratio ($\rho_{1600}/\rho_{25}$) of specific resistances at 25° C. and at 1600° C. of 0.85 to 1.00. The ratio of specific resistances ($\rho_{1600}/\rho_{25}$) is also referred to as a specific resistance change ratio. The specific resistance change ratio can also be expressed as a specific resistance reduction rate ($100-100\rho_{1600}/\rho_{25}$), and is 15% or less.

Further, the temperature at which the minimum specific resistance $\rho_{min}$ appears is 500° C. to 800° C., the minimum specific resistance ($\rho_{min}$) is 7.0 to 9.0 μΩ·m, and the ratio ($\rho_{min}/\rho_{25}$) of the minimum specific resistance and the specific resistance at 25° C. is 0.70 to 0.80. The ratio of specific resistances ($\rho_{min}/\rho_{25}$) is also referred to as a minimum specific resistance change ratio.

The graphite material of the present invention has a bulk density of 1.69 to 1.80 g/cm³, and preferably 1.69 to 1.75 g/cm³.

As for the crystal structure of the graphite material of the present invention, the interplanar distance ($d_{002}$) of the carbon net plane layers may preferably be 0.3360 to 0.3365 nm, the (Lc), which indicates the thickness of stacked carbon net plane layers, may preferably be 55 to 85 nm, and the (La), which indicates the spread of the carbon net plane, may preferably be 60 to 105 nm, and the graphitization degree (P1) may preferably be 0.55 to 0.60.

The product (Lc×La×P1) is favorably 1900 to 5000 nm² and is preferably 3000 to 5000 nm².

The (P1), the ($d_{002}$), the (Lc), and the (La) are related to the graphitization degree, and the (Lc) and the (La) are related to the crystallite size. Although these do not have a simple correlation, the value of ($d_{002}$) tends to be lower with increase in graphitization degree, and other values tend to be higher with increase in graphitization degree. For this reason, the values can be controlled by, for example, adjusting the graphitization temperature, or selecting an easy graphitizable raw material, or changing the use amount thereof.

The product (Lc×La×P1) is a product of the numerical values indicating the crystallinity and the graphitization degree of the graphite material. It has been found that, by setting this range at the foregoing range, it is possible to keep the specific resistance change ratio low while keeping the specific resistances at respective temperatures high.

The graphite material of the present invention can be suitably used as a graphite heater to be used utilizing Joule heat generation and is particularly useful as a graphite heater for heating a graphite crucible for storing a quartz crucible as a component for a semiconductor pull-up device, or the like.

The method for manufacturing a graphite material of the present invention is not particularly limited. For example, a graphite material can be obtained by a manufacturing method having the following steps:

a step (pulverizing step) of pulverizing an aggregate, which is used as a raw material, to a predetermined particle size; a step (kneading step) of mixing the pulverized aggregate and a binder at a prescribed ratio, and kneading the mixture while heating; a step (shaping step) of pulverizing the intermediate material (kneaded product) to a prescribed particle size, and filling the material into a rubber mold, or the like for shaping; a step (burning step) of heating and burning the resulting formed product in a non-oxidizing atmosphere; and a step (graphitizing step) of heating the burnt product in a non-oxidizing atmosphere so as to raise the temperature of the burnt product from 2800° C. up to 3000° C. for graphitization. A series of these steps can provide a graphite material.

One of the aggregates which can be used as raw materials is a pitch coke obtained by heating and coking a raw material pitch such as a petroleum pitch or a coal pitch. The structure of a pitch coke can be controlled by adjusting the characteristics of the raw material pitch. Specifically, the pitch coke is a mixture of a flow structure part at which a graphite crystal is likely to develop, and an amorphous texture part at which a graphite crystal is less likely to develop. By adjusting the characteristics of the raw material pitch, it is possible to control the ratio of these structures.

Further, as the aggregate, other than the pitch coke, a graphite material such as a natural graphite or an artificial graphite can also be used. Preferably, a pitch coke and a graphite material are desirably mixed and used. Two or more of pitch cokes or of graphite materials may be used.

Particularly, preferred is a mixed raw material of 40 to 60 parts by weight of a pitch coke (needle coke) in which the crystal textures are aligned in one direction, and 40 to 60 parts by weight of random amorphous pitch coke (amorphous coke) in which the crystal directions are random. Alternatively, also preferable is a mixed raw material of 40 to 60 parts by weight of a pitch coke and 40 to 60 parts by weight of a graphite.

The binder is preferably a material which can achieve a high carbonization yield, and resin binders and pitch binders can be used. A binder pitch using a coal pitch as a raw material is desirably used. The mixing ratios of the aggregate and the binder are preferably 50 to 30 parts by weight of the binder for 50 to 70 parts by weight of the aggregate.

The aggregate is previously pulverized to a prescribed particle size of a median particle size of 5 to 70 μm, and preferably 5 to 20 μm, and mixed with a binder with a particle size of 5 mm or less, followed by heating and kneading at 200° C. or higher and 300° C. or lower, to thereby produce a kneaded product. For kneading, a general kneading machine can be used, and a kneader capable of heating is suitable. The resulting kneaded product is once cooled, and then, is pulverized to a prescribed particle size, for example, 5 to 70 µm, and preferably 20 to 60 µm by a pulverizing machine. The pulverized product is filled, and is hermetically sealed in a mold such as a rubber mold or a rubber case. Then, for example, a pressure of 0.5 to 2.0 t/cm$^2$ is applied thereto, to produce a formed product. The methods for applying a pressure thereto include various methods. When a rubber case is used, a pressure is desirably applied by a hydrostatic pressing machine.

The obtained shaped product is burnt under a non-oxidizing atmosphere at about 800° C. to 1000° C., to produce a burnt product. Further, this is heated under a non-oxidizing atmosphere at 2800° C. to 3000° C. for graphitization, to thereby produce a graphite material.

Now the measuring method will be described below.

X-ray diffraction tests were demonstrated by an Ultima 3 system (manufactured by RIGAKU Corporation, Ltd.) using a CuKα ray. The applied voltage to an X ray tubular lamp was set to 40 kV, and the current was set to 20 mA. The measurement was performed with a scanning rate of a counter of 2°/min, and a scanning range of 10° to 90°, at an interval of 0.02°.

The value of ($d_{002}$) was determined from the position (angle) of the peak of the (002) plane at a diffraction angle 2θ of in the vicinity of 26°, and the peak position (angle) of the (111) plane of metal silicon, which was previously added as the internal standard, at a diffraction angle 2θ of in the vicinity of 28°.

The value of (Lc) was determined from the half-width of the peak of the (002) plane at a diffraction angle 2θ of in the vicinity of 26° and the half-width of the peak of the (111) plane of metal silicon, which was previously added as the internal standard, at a diffraction angle 2θ of in the vicinity of 28°. The value of (La) was determined by calculation based on the "Gakushin" method from the half-width of the peak of the (110) plane at a diffraction angle 2θ of in the vicinity of 77.6° and the half-width of the peak of the (331) plane of metal silicon, which was previously added as the internal standard, at a diffraction angle 2θ of in the vicinity of 76.4°.

The P1 value, which indicates the graphitization degree, was determined by the method described in the literature (IWASHITA, TANSO, No. 188, p. 147-151 (1999) "Analyzed Crystal Structure of Carbon Materials by X-ray Powder Diffraction"). Namely, the integration within a range from at the (hk0) diffraction angle to the (hk2) diffraction angle (10 diffraction line 2θ: 42.39 to 50.73°, 11 diffraction line 2θ: 77.54 to 83.67°) was performed, and the Fourier coefficient An(hk) was calculated from the integrated value of the product of the strength and the periodic function at each angle, thereby determining the P1 value.

The bulk density was determined by cutting a sample into pieces having a size of 10 mm×10 mm×60 mm, then measuring the volume and the mass of the sample, and calculating the bulk density on the basis of a method according to JIS-R 7222:2017 "Test methods for physical properties of graphite materials".

The specific resistance value ($\rho_{25}$) was calculated by cutting a sample having a size of 10 mm×10 mm×60 mm, passing a current of 1 A in the longitudinal direction of the sample, and measuring the voltage drop in a 50-mm section, and calculating the specific resistance value ($\rho_{25}$) on the basis of aa method according to JIS-R 7222-2017 "Test methods for physical properties of graphite materials".

The specific resistance value ($\rho_{1600}$) was determined by cutting out a sample having a size of 10 mm in diameter×100 mm length, and measuring a voltage drop while changing the temperature from 25° C. up to 1600° C. by a high-temperature specific resistance measuring device (see Adachi, et. al., TANSO, No. 146, p. 33 to 36 (1991) "The temperature dependence of electrical resistivity of polycrystalline graphite in the range of 900 K-2800 K").

EXAMPLES

The present invention will be described more specifically by way of Examples and Comparative Examples.

Example 1

An aggregate 1 obtained by pulverizing a pitch coke (needle coke) in which a flow structure was observed by polarizing microscopy into a particle size of 15 µm (particle size is represented as a median diameter; the same applies hereinafter), an aggregate 2 obtained by pulverizing a pitch coke (amorphous coke) in which an amorphous texture was observed into a particle size of 15 µm, and a binder B obtained by pulverizing a coal type binder pitch with a softening point of 105° C. into a particle size of 5 mm or less were mixed at a ratio of 30:30:40 in terms of parts by weight, respectively, and were kneaded while heating at 200 to 300° C. by a kneader, for kneading. The kneaded product was cooled, and was then repulverized into about 50 µm. This pulverized matter was filled in a rubber case and was shaped under a pressure of 1 t/cm$^2$ by a hydrostatic pressing machine. Thus-obtained product was burnt to 1000° C. under a non-oxidizing atmosphere, to produce a burnt product. Further, this burnt product was heated up to 3000° C. under a non-oxidizing atmosphere for graphitization, to thereby produce a graphite material 1.

Example 2

A graphite material 2 was obtained through kneading, pulverizing, shaping, burning, and graphitization steps in the same manner as in Example 1, except that the aggregate 1, the aggregate 2, and the binder B were mixed at ratios of 33:33:34 in terms of parts by weight, respectively.

Example 3

A graphite material 3 was obtained through kneading, pulverizing, shaping, burning, and graphitization steps in the same manner as in Example 1, except that the aggregate 1, an aggregate 3 obtained by pulverizing an artificial graphite powder into a particle size of 70 µm, and the binder B were mixed at a ratio of 40:20:40 in terms of parts by weight, respectively.

Comparative Example 1

A graphite material C1 was obtained through kneading, pulverizing, shaping, burning, and graphitization steps in the same manner as in Example 1, except that the aggregate 2, the aggregate 3, and the binder B were mixed at a ratio of 45:15:40 in terms of parts by weight, respectively.

Comparative Example 2

A graphite material C2 was obtained though kneading, pulverizing, shaping, burning, and graphitization steps in the same manner as in Example 1, except that the aggregate 2 and the binder B were mixed at a ratio of 65:35 in terms of parts by weight, respectively.

Comparative Example 3

A graphite material C3 was obtained through kneading, pulverizing, shaping, burning, and graphitization steps in the same manner as in Example 1, except that the aggregate 2, an aggregate 4 composed of carbon black, and the binder B were mixed at ratios of 55:10:35 in terms of parts by weight, respectively.

Comparative Example 4

A graphite material C4 was obtained through kneading, pulverizing, shaping, burning, and graphitization steps in the same manner as in Example 1, except that the aggregate 2 and the binder B were mixed at ratios of 65:35 in terms of parts by weight, respectively.

Comparative Example 5

An aggregate 5 obtained by pulverizing a needle coke into a particle size of 2 mm, and the binder B were mixed at a ratio of 65:35 in terms of parts by weight, respectively, and were kneaded while heating for kneading at 150 to 250° C. by a kneader. The kneaded product was cooled, and then was repulverized to 50 μm. This pulverized matter was filled in a mold and was shaped by a 2000-ton press. The shaped product was burnt to 1000° C. under a non-oxidizing atmosphere, to produce a burnt product. The burnt product was impregnated with a pitch, and was burnt at 1000° C. again. Further, this burnt product was further heated to 3000° C. under a non-oxidizing atmosphere for graphitization, to thereby produce a graphite material C5.

The results of measurements on physical properties of the produced graphite material are listed in Tables 1 and 2.

As described above, a specific resistance change ratio ($\rho_{1600}/\rho_{25}$) closer to 1.0 is more desirable. Those in Examples 1 to 3 were closer to 1.0 than those of Comparative Examples 1 to 3, and 5. For Comparative Example 4, although the specific resistance change ratio was close to 1.0, the specific resistance values at 25° C. and 1600° C. were both small, so that undesirably the cross sectional area in heater design becomes small.

For the product (Lc×La×P1), it is indicated that, even if the value of the product was smaller or larger than the prescribed range, the specific resistance change ratio was apart from 1.0.

For any of Examples 1 to 3, the specific resistance was stably kept within the temperature range of 25° C. to 1600° C., and the specific resistance change ratio (specific resistance reduction rate) was also small.

INDUSTRIAL APPLICABILITY

The present invention can provide a graphite material with well-balanced specific resistances at 25° C. and at 1600° C. and can contribute to the efficient design of a device dependent upon the specific resistance such as Joule heat generation.

TABLE 1

| Physical properties | Bulk density (g/cm³) | Specific resistance ($\rho_{25}$) (μΩ·m) | Specific resistance ($\rho_{1600}$) (μΩ·m) | Specific resistance change rate ($\rho_{1600}/\rho_{25}$) (—) | Specific resistance reduction rate (100−100$\rho_{1600}/\rho_{25}$) (%) | Minimum specific resistance ($\rho_{min}$) (μΩ·m) | Minimum specific resistance change ratio ($\rho_{min}/\rho_{25}$) (—) | Minimum specific resistance temperature (° C.) |
|---|---|---|---|---|---|---|---|---|
| Example 1 | 1.730 | 10.2 | 9.9 | 0.97 | 3 | 7.9 | 0.78 | 573 |
| Example 2 | 1.692 | 11.7 | 10.4 | 0.89 | 11 | 8.8 | 0.75 | 607 |
| Example 3 | 1.720 | 12.0 | 10.6 | 0.88 | 12 | 8.7 | 0.73 | 700 |
| Comparative Example 1 | 1.760 | 13.5 | 11.3 | 0.84 | 16 | 8.9 | 0.66 | 759 |
| Comparative Example 2 | 1.813 | 11.9 | 9.0 | 0.76 | 24 | 8.0 | 0.67 | 805 |
| Comparative Example 3 | 1.718 | 16.3 | 11.6 | 0.71 | 29 | 10.9 | 0.67 | 969 |
| Comparative Example 4 | 1.852 | 8.9 | 8.0 | 0.90 | 10 | 6.6 | 0.74 | 600 |
| Comparative Example 5 | 1.707 | 4.9 | 7.1 | 1.45 | −45 | 4.6 | 0.94 | 250 |

TABLE 2

| X-ray diffraction | d002 (nm) | Lc (nm) | La (nm) | P1 (—) | Lc × La × P1 (nm²) |
|---|---|---|---|---|---|
| Example 1 | 0.3361 | 84 | 101 | 0.58 | 4,921 |
| Example 2 | 0.3362 | 72 | 78 | 0.56 | 3,145 |
| Example 3 | 0.3364 | 59 | 61 | 0.53 | 1,907 |
| Comparative Example 1 | 0.3367 | 45 | 71 | 0.52 | 1,661 |
| Comparative Example 2 | 0.3369 | 38 | 51 | 0.50 | 969 |
| Comparative Example 3 | 0.3362 | 62 | 54 | 0.45 | 1,507 |
| Comparative Example 4 | 0.3366 | 49 | 59 | 0.52 | 1,503 |
| Comparative Example 5 | 0.3358 | 145 | 116 | 0.58 | 9,756 |

The invention claimed is:

1. A graphite material for a heater utilizing Joule heat generation, the graphite material satisfying a condition wherein a product (Lc×La×P1) of a size (Lc) value of a crystallite in a c-axis direction, the size (Lc) indicating a thickness of stacked carbon net plane layers, a size (La) of a crystallite in an a-axis direction, the size (La) indicating a spread of a carbon net plane, and a graphitization degree (P1) value is 1900 nm$^2$ or more and 5000 nm$^2$ or less, and having a specific resistance at 25° C. ($\rho_{25}$) of 10.0 μΩ·m or more and 12.0 μΩ·m or less, a specific resistance at 1600° C. ($\rho_{1600}$) of 9.5 μΩ·m or more and 11.0 μΩ·m or less, a ratio ($\rho_{1600}/\rho_{25}$) of specific resistance at 1600° C. to that at 25° C. of 0.85 or more and 1.00 or less, a temperature at which the minimum specific resistance ($\rho_{min}$) appears of 500° C. or higher and 800° C. or lower, a ratio ($\rho_{min}/\rho_{25}$) of the minimum specific resistance to the specific resistance at 25° C. of 0.70 or more and 0.80 or less, and a bulk density of 1.69 g/cm$^3$ or more and 1.73 g/cm$^3$ or less.

2. The graphite material according to claim 1, wherein
the graphite material has an interplanar distance ($d_{002}$) between carbon net plane layers of 0.3360 nm or more and 0.3365 nm or less, a size (Lc) of a crystallite in a c-axis direction, the size (Lc) indicating a thickness of stacked carbon net plane layers, of 55 nm or more and 85 nm or less, and a size (La) of a crystallite in an a-axis direction, the size (La) indicating a spread of a carbon net plane, of 60 nm or more and 105 nm or less, and a graphitization degree (P1) of 0.53 or more and 0.60 or less.

\* \* \* \* \*